United States Patent
Worger et al.

(10) Patent No.: US 6,173,176 B1
(45) Date of Patent: Jan. 9, 2001

(54) METHOD FOR SECTOR-BASED ROUTING

(75) Inventors: William R. Worger, Gilbert; Craig Long, Mesa, both of AZ (US)

(73) Assignee: Motorola, Inc., Schaumburg, IL (US)

( * ) Notice: Under 35 U.S.C. 154(b), the term of this patent shall be extended for 0 days.

(21) Appl. No.: 09/049,533

(22) Filed: Mar. 27, 1998

(51) Int. Cl.$^7$ .................................................. H04B 7/185
(52) U.S. Cl. .................... 455/428; 455/445; 455/13.1; 370/238; 370/389
(58) Field of Search .................................. 455/427, 428, 455/429, 430, 445, 12.1, 13.1, 13.3, 437, 456; 370/254, 238, 235, 400, 316, 351, 389, 912, 913; 342/352, 357, 354, 372; 379/220, 221

(56) References Cited

U.S. PATENT DOCUMENTS

| | | | |
|---|---|---|---|
| 5,115,433 | * | 5/1992 | Baran et al. .......................... 370/400 |
| 5,408,237 | * | 4/1995 | Patterson et al. ................... 455/13.1 |
| 5,991,388 | * | 11/1999 | Sonnenberg ......................... 379/220 |

FOREIGN PATENT DOCUMENTS

| | | | |
|---|---|---|---|
| 0774843 | 5/1997 | (EP) | ............................. H04B/7/185 |
| WO9309614 | 5/1993 | (WO) | ............................. H04B/7/204 |

\* cited by examiner

*Primary Examiner*—Reinhard J. Eisenzopf
*Assistant Examiner*—Lester G. Kincaid
(74) *Attorney, Agent, or Firm*—Harold C. McGurk; Sharon K. Coleman

(57) ABSTRACT

A communication system (10) has multiple satellites (20) communicating with ground stations (30) and with base stations (40). The satellites (20) are in non-geosynchronous orbit around the earth (52). A first ground station (30) transmits a data packet to a satellite (20). The data packet includes a sector number which represents an area on the earth (52) where the destination ground station (31) is located. The satellite (20) transmits the data packet to another satellite (20) if the satellite (20) is not serving an area identified by the sector number. This step is repeated until the data packet reaches a most likely satellite (20) that is most likely to be serving the area identified by the sector number. The most likely satellite (20) transmits the data packet to the destination ground station (31) if it is still serving the area identified by the sector number.

11 Claims, 2 Drawing Sheets

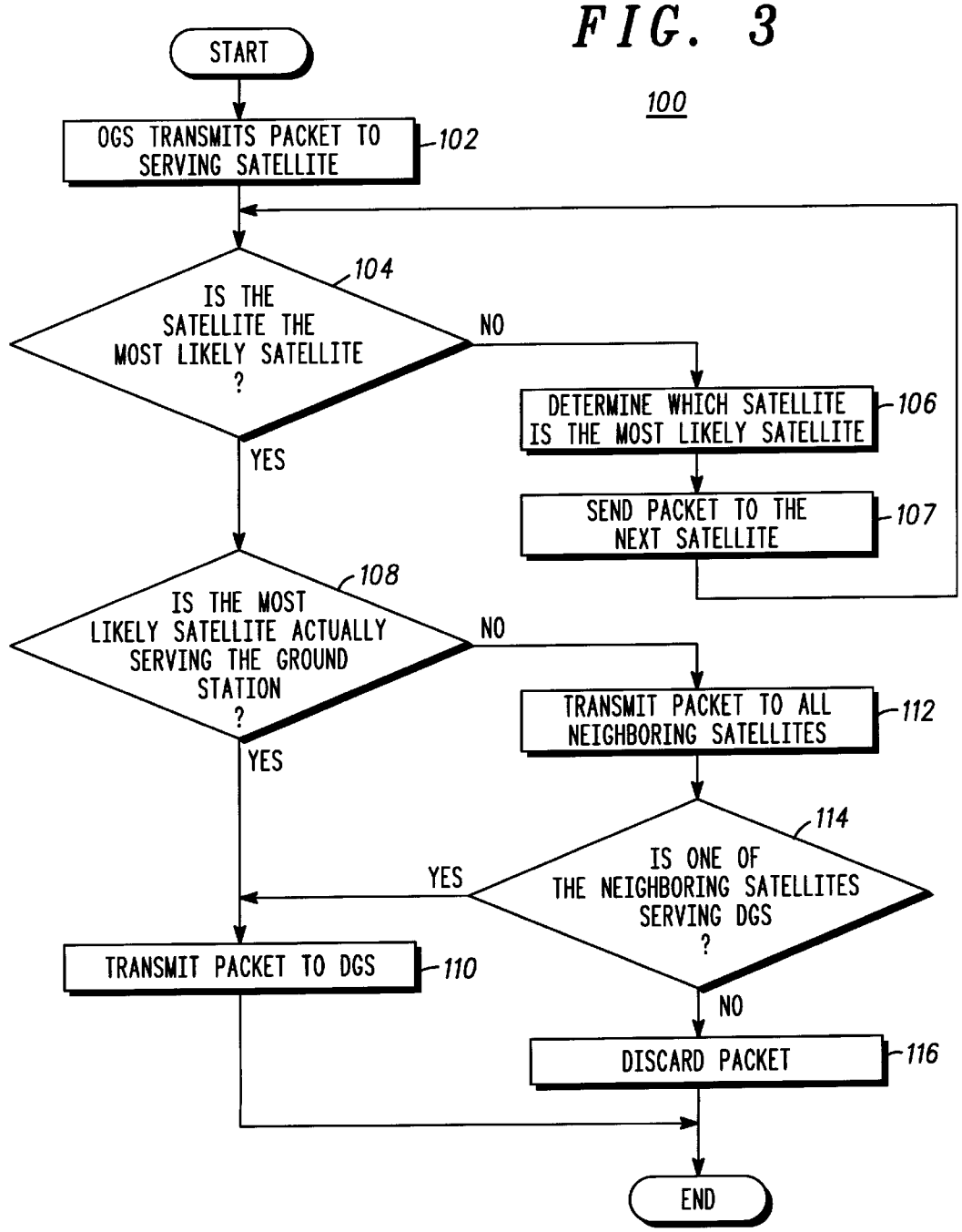

METHOD FOR SECTOR-BASED ROUTING

TECHNICAL FIELD

The invention relates to satellite communications, and, in particular, to a system and method for routing data to a ground station through a non-geostationary satellite system.

BACKGROUND OF THE INVENTION

Satellite communication systems transmit data to and receive data from users via radio-frequency communication links with movable (in a vehicle, airplane or ship, for example) or immovable ground stations. Such data can include voice, paging information, audio-visual information, facsimile data, and any other type of data or information.

Due to the orbital motion of the satellites in non-geostationary orbits including low-earth, medium-earth or combinations thereof, data communicated from one ground station to another ground station has to take different paths through the satellite constellation. This transfer or communication inherently produces an addressing and a routing problem. Existing conventional methods require that either the originating ground station know (or learn) about the movement of the satellite constellation with respect to the earth, or that each satellite in the satellite constellation translate the motion of the constellation into a variable routing path to reach a fixed-earth address associated with a ground station.

The first, existing conventional method of addressing and routing data or voice packets across a satellite constellation from one fixed ground station to another is to require the originating ground station to understand and tell the satellite constellation the proper route to take to get to the destination ground station. In order to do this, the originating ground station has to know which satellite is serving the destination ground station at all times. This usually requires a large amount of processing power in the originating ground station for calculating the exact location of all satellites in the constellation and for projecting the exact times that the destination ground station will be served by each satellite in the constellation. Moreover, a large amount of bandwidth is required to communicate that information to the originating ground station every time the path to the destination ground station changes (as it will in a non-geostationary system).

The second, existing conventional method of addressing and routing packets across a non-geostationary constellation is to require that each satellite in the constellation be able to track each destination ground station and translate that destination into address and routing information. This address and routing information changes as the non-geostationary constellation orbits the earth. This second conventional method requires a vast amount of processing power and storage in each of the satellite. Increased processing power and memory is directly proportional to increasing each satellite's weight and power requirements.

Accordingly, there is a substantial need to provide a system and method for creating an address and routing strategy that relieves the ground station of the burden of understanding the movement of the non-geostationary constellation and keeping extensive information about each of the destination ground stations.

BRIEF DESCRIPTION OF THE DRAWINGS

FIG. 3 shows a method of routing data from one ground station to another through a non-geostationary satellite system according to a preferred embodiment of the present invention.

DETAILED DESCRIPTION OF THE DRAWINGS

The present invention resolves the problem of addressing and routing packets of data or information through non-geostationary satellite constellation systems, including low-earth or medium-earth satellite constellations, or combinations thereof. This invention utilizes the concept of dividing the earth into sectors, assigning movable and immovable base stations and ground stations to those sectors, and routing packet data through the satellite constellation based on the way the nongeostationary satellite system covers the earth.

A "satellite" as used throughout this description means a man-made object or vehicle which orbit the earth at non-geostationary altitudes (e.g., low-earth or medium-earth altitudes). A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential.

Figure 1:
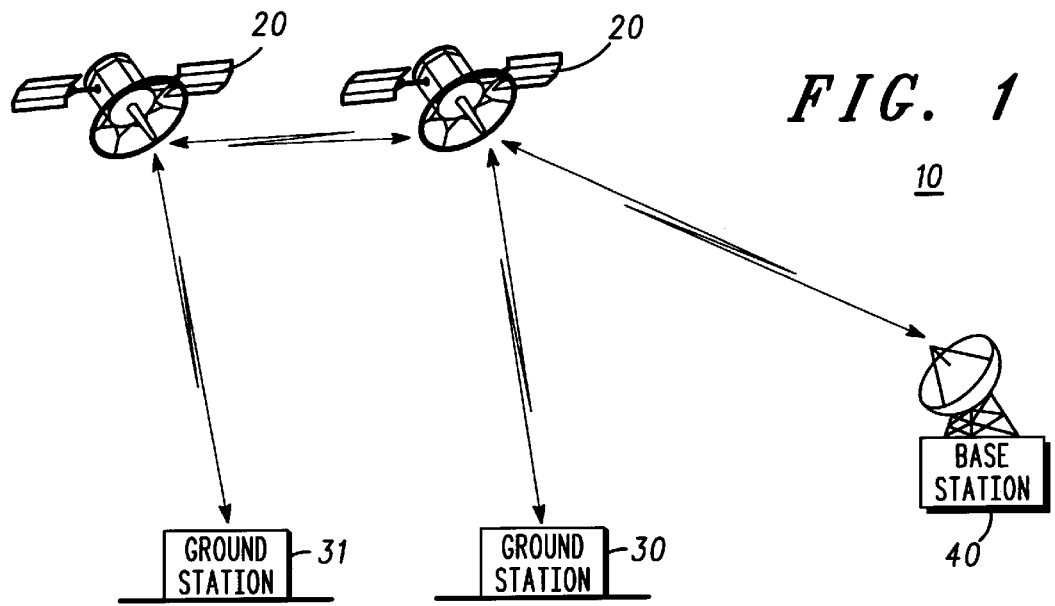
FIG. 1 shows a satellite communication system according to a preferred embodiment of the present invention.

FIG. 1 shows a satellite communication system according to a preferred embodiment of the present invention. Although FIG. 1 illustrates a highly simplified diagram of communication system 10, system 10 comprises a number of satellites 20, any number of ground stations 30, 31 and any number of base stations 40. Generally, communication system 10 including satellites 20, ground stations 30, 31 and base station 40, may be viewed as a network of nodes. All nodes of communication system 10 are or may be in data communication with other nodes of communication system 10 through communication links. In addition, all nodes of communication system 10 are or may be in data communication with other telephonic devices dispersed throughout the world through public switched telephone networks (PSTNs) and/or conventional terrestrial communication devices coupled to a PSTN through conventional terrestrial base stations.

The preferred embodiment of the present invention is applicable to space-based communication systems that assign particular regions on the earth to specific cells on the earth, and preferably to systems that move cells across the surface of the earth. Although the present invention is applicable to space-based communication systems 10 having at least one satellite 20 in low-earth or medium-earth orbit, satellite 20 is preferably part of a number of satellites in low-earth orbit around earth. However in alternative embodiments, satellite 20 can be a medium-earth orbit satellite. Satellite 20 can be in the same satellite network, or can be in different satellite networks, including for example, the IRIDIUM® and/or the GLOBALSTAR® networks. If they are in different satellite networks, one network can be designated as a primary satellite network, while the other satellite network can be designated as a secondary satellite network.

Satellite 20 can be one of many satellites in at least one constellation of satellites orbiting earth. The present invention is also applicable to space-based communication systems 10 having satellites 20 which orbit earth at any angle of inclination including polar, equatorial, inclined or other orbital patterns. The present invention is applicable to systems 10 where full coverage of the earth is not achieved (i.e., where there are "holes" in the communication coverage provided by the constellation) and to systems 10 where plural coverage of portions of the earth occur (i.e., more than one satellite is in view of a particular point on the earth's surface).

Each satellite 20 communicates with other adjacent satellites 20 through cross-links in the preferred embodiment of the present invention. These cross-links form a backbone of space-based satellite communication system 10. Thus, a call or communication from one ground station located at any point on or near the surface of the earth may be routed through a satellite or a constellation of satellites to within range of substantially any other point on the surface of the earth. A communication may be routed down to a ground station (which is receiving the call) on or near the surface of the earth from another satellite 20. It is well known to those of ordinary skill in the art on how satellite 20 physically communicates with ground stations 30 and base stations 40.

Ground stations 30, 31 may be located anywhere on the surface of earth or in the atmosphere above earth. Communication system 10 may accommodate any number of ground stations 30, 31. Ground stations 30, 31 are preferably communication devices capable of transmitting and receiving data. The data can of any type, including alphanumeric or numeric for example. By way of example, ground stations 30, 31 can be customer premise equipment, adapted to transmit to and receive video transmissions from satellites 20. Moreover, ground stations 30, 31 do not have to be mobile or moving, but can be fixed in one location for an extended period of time.

How ground stations 30, 31 physically transmit data to and receive data from satellites 20 is well known to those of ordinary skill in the art. In the preferred embodiment of the present invention, ground stations 30, 31 communicate with satellite 20 using a limited portion of the electromagnetic spectrum that is divided into numerous channels. The channels are preferably combinations of L-Band, K-Band and/or S-band frequency channels but may encompass Frequency Division Multiple Access (FDMA) and/or Time Division Multiple Access (TDMA) and/or Code Division Multiple Access (CDMA) communication or any other combination thereof. Other methods can be used as is known to those of ordinary skill in the art.

Base station 40 communicates with and controls satellites 20. There may be multiple base stations 40 located at different regions on the earth. For example, there may be one base station 40 located in Honolulu, another located in Los Angeles and another in Washington, D.C. Another example is to have separate base stations located in each country on the earth. Base stations 40 can provide satellite control commands to satellites 20 so that satellites 20 maintain their proper orbital position and perform other essential housekeeping tasks. Base stations 40 can be additionally responsible for receiving calling packet data, paging data or other types of information from satellite 20. How base stations 40 physically communicate with satellites 20 and/or ground stations 30 is well known to those of ordinary skill in the art. Base station 40 can additionally be connected to a PSTN.

Base stations 40 provide certain basic services within satellite communication system 10. They provide control of access to the system for subscribers for whom a base station is "home", e.g., where information is stored about the subscribers, including information to authenticate the subscriber's identity and what services are available to the subscriber. The base stations 40 also provide system subscribers with access to PSTN(s), and it provides PSTN customers with access to system subscribers through the satellite network.

Figure 2:
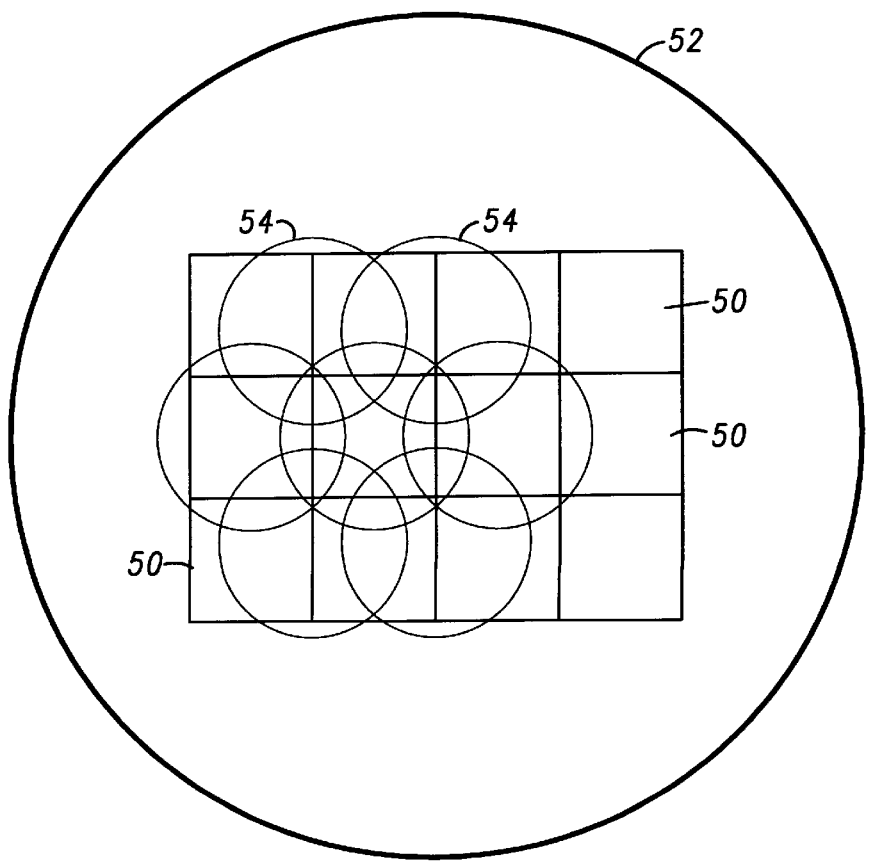
FIG. 2 shows an example of a relationship of an earth-based sector to a satellite footprint.

FIG. 2 shows an example of a relationship of an earth-based sector to a satellite footprint. As shown in FIG. 2, each sector 50 is represented by a square although other shapes and sizes can be used as well. FIG. 2 shows twelve sectors in a three row by four column matrix. In the preferred embodiment, earth 52 is divided into less than 1000 sectors. Sector 50 is defined as a geographical area on earth 52 which is less than or equal to the projection of a single satellite antenna pattern 54 on the earth. Although antenna pattern 54 is shown as circles in FIG. 2, those of ordinary skill in the art know that antenna pattern 54 can have other shapes and sizes as well, including an elliptical shape, for example. Sector 50 has to be small enough to be completely or almost covered by a single satellite. Base station 40 is responsible for dividing earth into a number of regions, each region being distinct from another region, and for assigning a unique sector number to each of the regions.

Each ground stations is assigned to one sector 50. A ground station is assigned one of the sectors 50 upon installation by using various means well known to those of ordinary skill in the art, including referring to a latitude and longitude of where the ground station is going to be located on earth and setting the sector number of the ground terminal to the sector that corresponds to particular latitude and longitude. The particular latitude and longitude of where a ground terminal is located can be obtained from a Global Positioning System (GPS), for example. GPS is well known to those of ordinary skill in the art.

FIG. 3 shows a method of routing data from one ground station to another through a non-geostationary satellite system according to a preferred embodiment of the present invention. Although method 100 is discussed in reference to routing a data packet between two ground stations, it is equally applicable for routing data packet or packets between a ground station and a base station, or between two base stations.

A brief overview of method 100 will be described first, followed by a detailed description to each of the steps in method 100. In brief, individual ground stations are addressed by specifying an individual ground station identifier and a sector in which that ground station is located. Each satellite in the non-geostationary constellation tracks which satellite(s) can service which sectors at specific periods of time. The method determines a "most likely" serving satellite whereby all data packets for all ground stations in that sector will be sent to it. The most likely serving satellite determines if it is serving the destination ground station. If the most likely serving satellite is not serving the destination ground station, it will multicast that packet to each of its neighbor satellites. Each of those satellites attempt to serve the destination ground station. Since the size of a sector is less than or equal to the projection of a single satellite beam pattern projection on the earth, one of the neighbors of the most likely serving satellite will most likely be the serving the destination ground station.

As shown in FIG. 3, method 100 begins in step 102 when an originating ground station ("OGS") transmits a packet to a satellite serving the sector where the OGS is located. Although reference is made to a single packet, in alternative embodiments, multiple packets can be transmitted as well. However, for the purposes of discussing method 100, a single packet will be referenced. The packet is addressed to the serving satellite by specifying an address which comprises a sector of where the destination ground station ("DGS") is located and a sector unique ID of the DGS. The sector unique ID identifies the DGS from other DGS's.

Once the packet is transmitted in step 102, the satellite serving the OGS checks the address of the packet sent by the OGS and determines in step 104 whether it is the most likely satellite to be serving the destination sector. The determination can be as simple as checking the sector of the DGS sent in the address of the packet against a table of sectors stored in the satellite that list what sectors are currently being serviced by the satellite. There are other ways of making this determination which are well known to those of ordinary skill in the art.

If the satellite determines in step 104 that it is not the most likely satellite to be serving the DGS, the satellite determines in step 106 what satellite is the most likely satellite to be serving that sector. The determination of what satellite is the most likely satellite can be based on a comparison between the sector of the DGS (contained in the address of the packet) with a table which associates each sector with a particular satellite. If the current satellite is in direct communication with the most likely satellite, the current satellite transmits in step 107 the packet to the most likely satellite. However, if the current satellite is not in direct communication with the most likely satellite, the current satellite has to determine what intervening satellite should receive the packet. The "next satellite" refers to the intervening satellite that should receive the packet. Once the determination of what intervening satellite should receive the packet, the current satellite transmits in step 107 the packet to the next satellite.

After step 107, the next satellite or the most likely satellite then executes step 104 to determine whether it is the most likely satellite to serve the sector of the DGS. As can be seen from FIG. 3, steps 104 and 106 are repeated until a satellite determines that it is the most likely satellite to be serving the destination sector of the DGS. A packet can pass through many other intervening satellites, each one checking to see if it is the most likely satellite to serve the destination sector. Each one forwards the packet until the most likely satellite is reached.

Once the most likely satellite is reached as determined in step 104, the most likely satellite then determines in step 108 whether it is still actually serving the DGS. This determination performed by step 108 is needed because the satellites are always moving in orbit around the earth, and by the time the packet reaches the most likely satellite, it has stopped communicating with the DGS.

If the most likely satellite determines that it is still serving the DGS in step 108, the most likely satellite transmits in step 110 the packet to the DGS. The transmission by the most likely satellite occurs on a beam and frequency to which the DGS is tuned. If the most likely satellite is not serving the DGS as determined in step 108, then the most likely satellite transmits the packet to all neighboring satellites in step 112. A neighboring satellite is one in which the satellite has a direct connection (via a cross-link). There is a strong possibility that one of the neighboring satellites is serving the sector of where the DGS is located. If one of the neighboring satellites determines in step 114 that it is serving the sector of where the DGS is located, the packet is transmitted in step 110 by the other satellite to the DGS. Subsequent to step 110, method 100 ends. Otherwise, the packet is discarded in step 116, and method 100 ends. Method 100 ensures that the packets will find its destination and reach the DGS even if the most likely satellite changes while the packet is being routed.

There are many important advantages of the present invention such as reduced overhead, reduced processing requirements at the ground stations and reduced processing requirements on each of the non-geostationary satellites in the satellite constellation. Other advantages of the present invention are cheaper, faster ground stations, smaller, lighter satellites and more efficient use of the spectral resources of the system.

Another advantage of the invention is that the complexity of the ground stations is reduced by allowing the grounds stations to use a fixed, earth-based sector addressing scheme to locate and find any ground station. The fact that the satellites are orbiting the earth is transparent to the ground stations. Thus, the ground stations do not have to keep satellite ephemeris data in order to send packets to destination ground stations. This significantly reduces the bandwidth (constantly receiving satellite ephemeris data), processing power (projecting future satellite ephemeris), and storage (storing projected satellite ephemeris) in the ground stations.

Yet another advantage of the invention is that routing on the satellite is simplified in comparison to other fixed earth addressing schemes. Since the address contains the destination sector of the DGS, the satellite performs a quick look-up in a table of less than 1000 sectors (as opposed to possible millions of ground stations) to determine if the packet is meant for this satellite. Only if the packet is destined for a sector being served by that satellite does the satellite have to inspect the entire address. This address sectorization reduces storage requirements, required processing power, and routing delay on the satellite.

It is another advantage of the invention in that amount of bandwidth is reduced for keeping the originating ground station apprised of the destination ground station address. In comparison, conventional routing methods required the originating ground station to know the satellite that is serving the destination ground station. In those schemes, each time a ground station's communication links are handed from one satellite to the next, signaling had to be used to inform the originating ground station that a handoff had occurred. This invention eliminated the need for the originating ground station to know the destination satellite, thus preserving this bandwidth for traffic use.

Accordingly, it is intended by the appended claims to cover all modifications of the invention which fall within the true spirit and scope of the invention.

What is claimed is:

1. A method for sector based-routing, comprising the steps of:
  a) transmitting a data packet to a satellite;
  b) the satellite transmitting the data packet if the satellite is serving an area on earth identified by a sector number included in the data packet;
  wherein step (b) comprises the steps of:
    (b1) the satellite transmitting the data packet to another satellite if the satellite is not serving the area identified by the sector number; and
    (b2) repeating step (b1) until the data packet reaches a most likely satellite that is most likely to be serving the area identified by the sector number;
    the most likely satellite transmitting the data packet to all neighboring satellites if it is not serving the area identified by the sector number;
    one of the neighboring satellites transmitting the data packet if it is serving the area identified by the sector number; and each of the other of the neighboring satellites discarding the data packet if each determines that it is not serving the area identified by the sector number.

2. A method as recited in claim 1, wherein step (a) comprises the step of a ground station transmitting the data packet to the satellite.

3. A method as recited in claim 1, wherein step (a) comprises the step of a base station transmitting the data packet to the satellite.

4. A method as recited in claim 1, wherein step (b) comprises the step of the satellite transmitting the data packet to a ground station if the satellite is serving the area identified by the sector number.

5. A method as recited in claim 1, wherein step (b) comprises the step of the satellite transmitting the data packet to a base station if the satellite is serving the area identified by the sector number.

6. A method as recited in claim 1, wherein step (b) comprises the step of the satellite transmitting the data packet to another satellite if the satellite is not serving the area identified by the sector number.

7. A method as recited in claim 6, further comprising the step of the satellite choosing the another satellite from a determination of whether the another satellite is most likely to be serving the area identified by the sector number.

8. A method as recited in claim 6, further comprising the step of the satellite choosing the another satellite from a determination of whether the another satellite is an intervening satellite that is in communication with a second satellite which is most likely to be serving the area identified by the sector number.

9. A method as recited in claim 1, further comprising the step of the most likely satellite transmitting the data packet to a designated ground station if it is still serving the area identified by the sector number.

10. A method as recited in claim 1, further comprising the step of the most likely satellite transmitting the data packet to a designated base station if it is still serving the area identified by the sector number.

11. A method for sector-based routing comprising the steps of:

a) a first ground station transmitting a data packet to a satellite, the data packet including a sector number;

b) the satellite transmitting the data packet to another satellite if the satellite is not serving an area identified by the sector number;

c) repeating step (b) until the data packet reaches a most likely satellite that is most likely to be serving the area identified by the sector number;

d) the most likely satellite transmitting the data packet to a designated ground station if it is still serving the area identified by the sector number;

e) the most likely satellite transmitting the data packet to all neighboring satellites if it is not serving the area identified by the sector number;

f) one of the neighboring satellites transmitting the data packet if it is serving the area identified by the sector number; and g) each of the other of the neighboring satellites discarding the data packet if each determines that it is not serving the area identified by the sector number.

* * * * *